United States Patent [19]

Fernandez et al.

[11] 4,357,013
[45] Nov. 2, 1982

[54] REINFORCED FOAM CORE COMPOSITE STRUCTURE AND METHOD

[76] Inventors: David Fernandez, 1457 Dara St., Camarillo, Calif. 93010; Francis Van Dyck, 2 Rue de Verviers, Boite 43, 4020 Liege, Belgium

[21] Appl. No.: 289,038

[22] Filed: Jul. 31, 1981

[51] Int. Cl.³ .............................................. A63B 49/10
[52] U.S. Cl. .................... 273/73 C; 264/45.3; 264/46.6; 264/46.7; 264/54; 273/73 F
[58] Field of Search ............... 273/73 R, 73 C, 73 F; 264/45.3, 45.5, 46.6, 46.7, 54

[56] References Cited

U.S. PATENT DOCUMENTS

| | | | |
|---|---|---|---|
| 3,930,920 | 1/1976 | Kicherer | 156/156 |
| 4,042,238 | 8/1977 | Theriault | 273/73 C |
| 4,061,520 | 12/1977 | Cecka et al. | 156/245 |
| 4,070,020 | 1/1978 | Dano | 273/73 F |
| 4,070,021 | 1/1978 | Cecka et al. | 273/73 F |
| 4,114,880 | 9/1978 | Cecka | 273/73 G |
| 4,175,745 | 11/1979 | Gevers et al. | 273/73 K |

*Primary Examiner*—Anton O. Oechsle
*Attorney, Agent, or Firm*—Poms, Smith, Lande & Rose

[57] ABSTRACT

A tubular frame structure adapted for use as a tennis racket having a rigid outer shell of composite material and an inner reinforced foam core including a foam portion and honeycomb reinforcement layers. The honeycomb reinforcement layers are oriented so that string holes passing through the frame pass through the foam core and rigid shell, but do not pass through the honeycomb layers. The use of honeycomb reinforcement layers is particularly well suited for use with elastic polymer foam cores.

22 Claims, 10 Drawing Figures

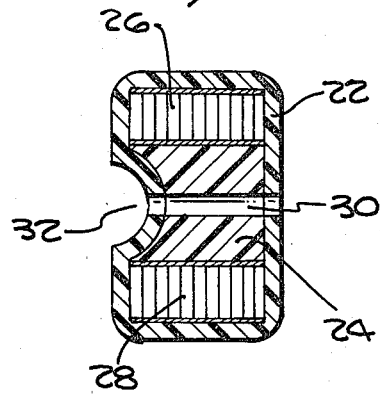
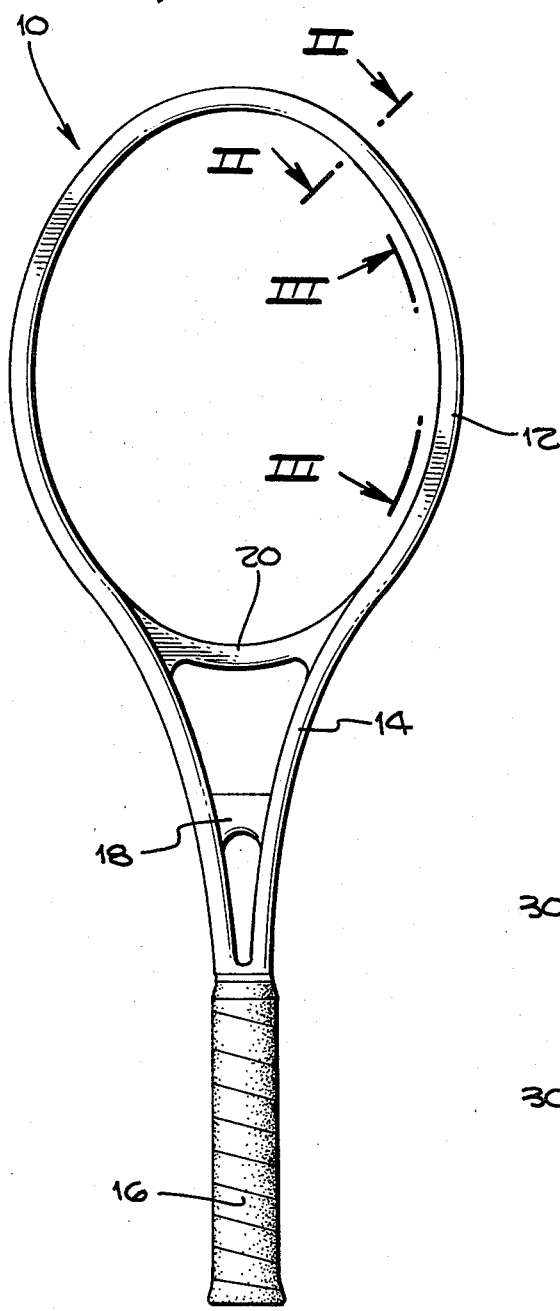
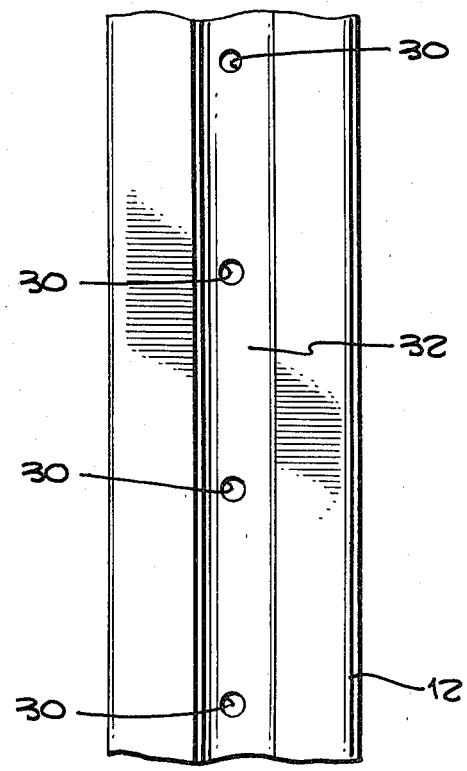

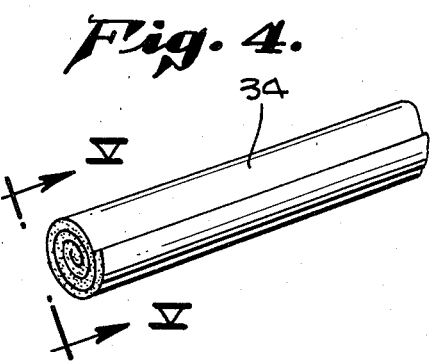
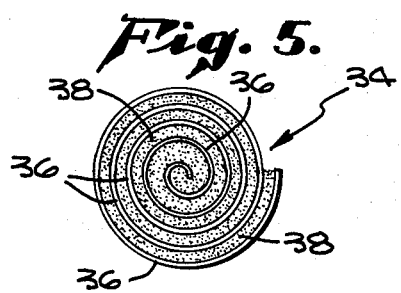
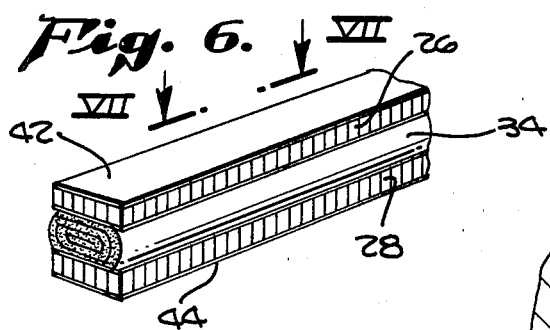
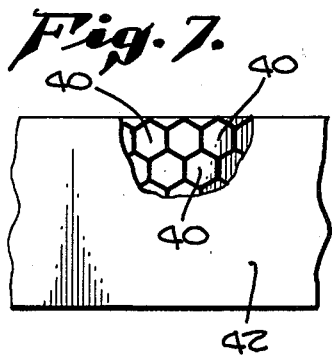
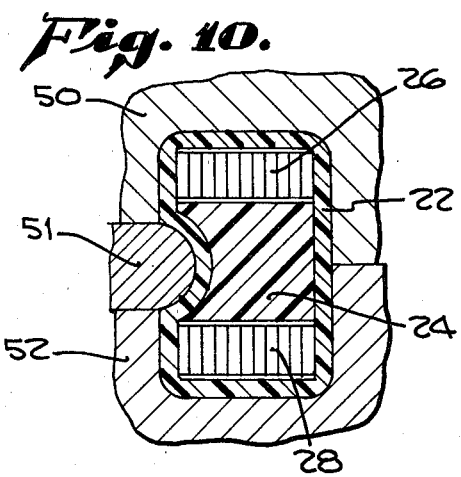
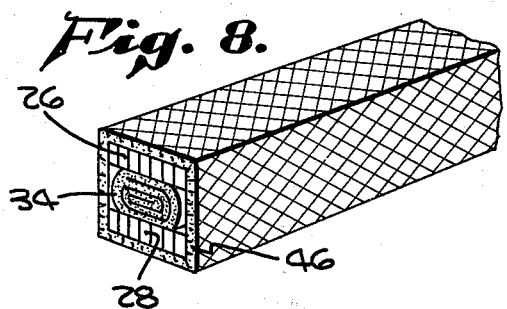
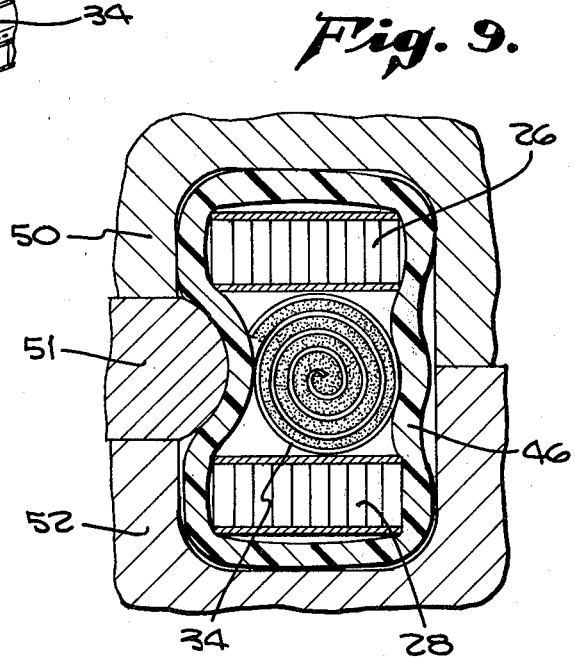

REINFORCED FOAM CORE COMPOSITE STRUCTURE AND METHOD

BACKGROUND OF THE INVENTION

The present invention relates generally to high strength, low weight structures comprising an amorphous core or filler material surrounded by and fused to a shell composed of resin-coated high strength composite filaments or fibers. More specifically, the present invention relates to a lightweight, high strength and stiff tennis racket having improved energy absorption characteristics, structural endurance and playability wherein the amorphous core is made from a combination of flexible polymer foam and lightweight honeycomb reinforcement layers or structures.

There is presently available to today's tennis player, a wide variety of tennis rackets. These tennis rackets are made from various different materials and are available in numerous different sizes, weights, and configurations.

One of the more popular tennis frames developed recently is based on the use of resin-coated composite filamentary materials such as graphite fiber, glass fiber, boron filaments, kevlar filaments or any combinations thereof. By far, the most popular composite racket is made from resin impregnated graphite fibers.

Graphite fiber composite materials were originally developed for aerospace applications in high performance aircraft and missile structures. Due to the inherent lightweight and high strength of graphite composites, they were also found especially well-suited for use in sports equipment. As a result, graphite composites have been widely used in the production of lightweight, high strength and high performance tennis racket frames. When cured at elevated temperatures, the resin-coated graphite fibers form a high strength, rigid and lightweight structure which is particularly well-suited for providing a high performance tennis racket.

Basically, tennis frames made from graphite composites include a tubular rigid composite frame structure or shell. The hollow core present in such a tubular frame structure is typically filled with a variety of core materials. The properties and configurations of both the rigid composite shell and core structure are important in providing a tennis racket with desired performance qualities. Graphite fibers of various different sizes impregnated with a wide variety of resin materials are commercially available. Many of these commercially available graphite composite materials have been used to provide entirely adequate rigid tubular tennis frame structures. With regard to the core structure, however, there has yet to be developed a core material or structure which has been found entirely adequate for use in the high performance graphite tennis rackets.

An optimum core structure should provide good energy absorption characteristics to reduce shock and vibration which otherwise would be present in a hollow tubular frame structure during ball impact. Further, the mass distribution of the core material throughout the tennis frame tubular structure should be easily varied. This variable mass distribution allows fine tuning or balancing of mass between the frame head and handle to enhance desired performance characteristics. The core structure should also be resistant to degradation and decomposition due to shock and vibration over long periods of racket use. In addition, it is desirable that the core material fuse or otherwise bond to the interior of the rigid composite shell to insure a solid vibration-free feel during racket use.

Another important property desirable in an optimum core material is the ability of the core material to expand or otherwise provide internal pressurization during molding of the graphite racket. Typical production of graphite composite/core tennis rackets involves surrounding the core with graphite fibers in specific orientations. The graphite fiber/core structure is then molded at elevated temperatures to provide the desired structural shape. The internal pressure for insuring that the rigid graphite shell is molded properly is typically and most conveniently provided by the core itself. The core material's ability to expand or otherwise generate internal pressure is therefore an important quality which is desirable in commercial process for producing such graphite composite tennis rackets.

Foamable or intumescent resinous compositions have been utilized as suitable core materials. Foamable materials are desirable since they provide the necessary internal pressure during the molding operation. Typically, the resin compositions are mixed with various additives such as barium sulfate, chopped cork, glass, asbestos, fibers, mica flakes and the like. These additives are used for various reasons ranging from control of density within the core to low density fillers to produce a lighter weight racket. These resinous core compositions typically include epoxy of phenolic resins. The core characteristics range from stiff, hard and brittle compositions, to those compositions having consistencies of firm putty or molding clay. Although many of the core materials presently being used in graphite frames have been found adequate for their intended purpose, problems have been experienced with premature deterioration and crumbling of the core material resulting in loss thereof through stringing holes or other openings in the racket frame.

In response to the need for an optimum core material and structure, one of the coinventors of the present application developed a flexible core structure made from plasticized polyvinyl chloride which was found to provide enhanced racket performance characteristics. The elastic core and the composite structure based thereon is the subject of a copending patent application entitled "ELASTIC CORE COMPOSITE STRUCTURE" filed July 31, 1981, and given Ser. No. 288,999. This new elastic or flexible polymer core is based on a flexible vinyl foam which is most preferably made from a plasticized polyvinyl chloride in which a suitable blowing agent is dispersed.

Although this new flexible foam core structure provides a tennis racket frame with desirable high performance characteristics, a core structure made entirely from flexible foam may not provide the desired high strength and stiffness required for certain performance applications. Accordingly, it would be desirable to provide a new core structure which not only includes the advantages of the previously described elastic or flexible cores, but also includes enhanced structure reinforcement to provide an especially strong reinforced composite tennis frame structure.

SUMMARY OF THE INVENTION

In accordance with the present invention, a composite structure is provided in which the core has all the desirable core characteristics provided by an elastic or flexible core composition and which in addition includes structural reinforcement.

The present invention is based upon a tubular frame adapted for use as a tennis racket which includes a core structure surrounded by a rigid composite shell. The core structure includes an elastic polymer which is reinforced by one or more lightweight honeycomb structures or layers. The flexible or elastic polymer core is prepared in accordance with the copending application mentioned in the background of the invention, the contents of which are hereby incorporated by reference. The improved core structure basically includes a central flexible core through which string holes may be drilled for racket stringing or rigging. The core structure further includes honeycomb structures disposed laterally on either side of the flexible central core. The honeycomb structures are oriented so that the string holes do not pass through or contact the honeycomb structures. The preferred honeycomb structures are conventional honeycomb reinforcement layers made from lightweight metals, such as aluminum. Lightweight metallic honeycomb structures are well-known for use in structurally reinforcing various articles where high strength and light weight is required.

The use of honeycomb reinforcing structures in tennis racket frames is not new. In U.S. Pat. No. 4,175,745, issued to Gevers, et al. on Nov. 27, 1979, an improved metal racket is disclosed in which honeycomb structures are utilized for reinforcement. In order to prevent abrasion and fraying of tennis strings which pass through the honeycomb structure, plastic or other smooth inserts must be provided to prevent the tennis strings from being frayed by continued contact with the relatively jagged surfaces resulting from holes drilled through the honeycomb. As a particular feature of the present invention, the elastic core and honeycomb layers are oriented so as to prevent the tennis racket strings from contacting the honeycomb structure. This provides an improved tennis racket structure which not only includes the desirable characteristic of honeycomb reinforced rackets, but also includes those desirable characteristics of an elastic core which includes the increased shock absorption, variable density distribution and protection of racket strings from jagged metal edges. Although it is preferred that the honeycomb reinforcements in accordance with the present invention be used in conjunction with flexible foam cores, the honeycomb reinforcements may also be used with other conventional rigid or semi rigid foam or intumescent type core materials.

A method is disclosed for producing the improved racket frame structure in accordance with the present invention. The method involves forming an elastic core precursor having suitable blowing agent distributed therein and placing on opposite sides of the core precursor suitable lightweight honeycomb layers. The elastic core/honeycomb structure is then surrounded by suitably woven resin impregnated fibers. The elastic core and honeycomb layers surrounded by the composite fibers are then placed in a suitable mold and cured under conventional internal pressure molding techniques.

The above discussed and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 1 is a general view of an exemplary tubular frame tennis racket in accordance with the present invention.

FIG. 2 is a cross-sectional view of FIG. 1 taken in the II—II plane.

FIG. 3 is a view of the improved tubular frame structure of FIG. 1 taken in the III—III plane.

FIG. 4 is a perspective view of a preferred spirally wrapped core precursor.

FIG. 5 is a cross-sectional view of FIG. 4 taken in the II—II plane.

FIG. 6 is a perspective view of the uncured core structure including the honeycomb layers and elastic core precursor.

FIG. 7 is a partial cut-away view of FIG. 6 taken in the VII—VII plane.

FIG. 8 is a perspective view of the tubular structure prior to curing and molding including the uncured composite fiber shell.

FIG. 9 is a sectional view of the uncured tubular structure when placed in a suitable racket mold.

FIG. 10 is a sectional view showing the heat-cured tubular frame structure in accordance with the present invention after curing and molding in the exemplary racket mold.

DETAILED DESCRIPTION OF THE INVENTION

A tennis racket in accordance with the present invention is shown generally at 10 in FIG. 1. The tennis racket 10 includes a head portion 12, a neck portion 14, and handle 16. The neck portion 14 includes lower cross-brace 18 and an upper cross-brace member 20 which not only provides strength and stiffness to the neck and head portions, but also provides a member through which racket strings may be attached. The upper cross-brace 20 may be viewed as part of the racket head portion 12.

The tennis racket 10 is a conventional tubular structure made preferably from resin-impregnated graphite fibers. The use of resin-impregnated graphite fibers to produce tubular tennis rackets is well known. Although the preferred tennis racket 10 is made from graphite fibers, it should be noted that other composite materials such as boron filaments, glass fibers, polyamide fibers (Kevlar), or the like, may be utilized in accordance with the present invention.

A cross-section of the racket head portion 12 is shown in FIG. 2. This tubular frame structure includes the rigid composite material tubular shell 22, foam core 24, and honeycomb reinforcement layers 26 and 28. As shown in FIGS. 2 and 3, the racket head portion 12 includes a plurality of racket string holes 30. As is well known, the string holes 30 are utilized in mounting racket strings (not shown) necessary to provide a complete tennis racket. The racket string holes 30 extend laterally through the tubular frame structure. As an important feature of the present invention, the honeycomb layers 26 and 28 are oriented as shown in FIG. 2 so that the racket string holes 30 pass through the composite shell 22 and foam core 24, but do not pass through the honeycomb layers 26 and 28. This feature is important in preventing the racket strings passing through the racket string holes 30 from contacting the relatively rough or jagged edges which would be presented by a string hole passing through the multi-celled honeycomb layer. Passage of racket strings through the honeycomb layer would result in premature fraying and failure of the racket strings. Accordingly, the present invention prevents such premature failure by precluding any possible contact of the racket strings with the honeycomb layers 26 and 28.

The cross-sectional shape of the tubular structure, as best shown in FIG. 2, is not critical. A relatively rectangular tubular structure with a groove 32 is preferred due to aesthetic as well as performance characteristics. The actual final molded cross-sectional shape of the tubular structure is not critical so long as the honeycomb reinforcement layers and foam core can be suitably oriented therein.

The preferred method for preparing tubular frame structures in accordance with the present invention involves the well-known high-temperature molding of composite materials in an exterior mold utilizing a foamable core material to provide the internal pressure necessary to force the composite layer outward against the mold. As a first step, a suitable foam core precursor must be made. The preferred foam core precursor is shown in FIG. 4 at 34. Any type of foamable or intumescent material may be utilized. The particular type of foaming compound is not critical so long as it produces a desirable foam and exerts sufficient internal pressure when heated to composite curing temperatures around 225 degrees F. to 350 degrees F. Although any of the foamable compounds producing stiff or firm foams may be utilized, it is preferred that a foamable elastic polymer which produces a flexible or elastic foam be utilized. Even more preferred, is a core precursor which is made from spirally wrapped plasticized or flexible polyvinylchloride. As previously discussed in the background of the invention, the use of elastic vinyl foams as core materials in tubular graphite rackets is disclosed in a co-pending application which was incorporated by reference. It is preferred that the core precursor be prepared in accordance with that disclosure. The core precursor 34 is prepared by impregnating a thin (i.e., 0.001 inch to 0.015 inch) flexible polyvinylchloride sheet with a suitable chemical blowing agent. The preferred blowing agent is 2,2'-azobisisobutyronitrile (AZDN). The AZDN is applied to the polyvinylchloride film preferably as a powder. The polyvinylchloride is then spirally wrapped to form the core precursor 34. As best shown in FIG. 5, spiral wrapping of the resin-impregnated polyvinyl sheet results in a series of polyvinylchloride layers 36 between which is dispersed the blowing agent 38. The spiral wrapping of the polyvinylchloride sheeting with the blowing agent dispersed therein is an especially suitable and convenient means for providing the desired final foam core structure. More than one sheet may be wrapped if desired.

As a second step in preparation of the preferred tubular frame structure, the foam core precursor 34 is sandwiched between the two honeycomb reinforcement layers 26 and 28. The honeycomb layers, as best shown in FIG. 7, include a plurality of honeycomb cells 40 which are bounded on both ends by honeycomb border layers 42 and 44. Lightweight honeycomb reinforcement structures are well-known and commonly utilized where lightweight, strong and stiff structures are required. The preferred honeycomb layers are made from aluminum or aluminum alloy. Other lightweight metals may be utilized if desired. In addition, non-metallic honeycomb structures may also be utilized. For example, honeycomb reinforcement structures made from resin treated aramide fibers marketed by DuPont under the tradename NOMEX may be utilized. Further, glass fiber reinforced honeycomb structures, such as HRH 372 may also be used. HRH 372 is a glass fabric bias weave reinforced plastic honeycomb incorporating a polyimide resin system. Any other, suitably strong and light-weight honeycomb structures may also be utilized in accordance with the present invention. The honeycomb cells preferably have their axes perpendicular to the longitudinal axis of the tubular structure. Preferred honeycomb cells will range in cross-sectional diameter from 1/16 inch to ¼ inch and preferably ⅛ inch. The preferred width of the honeycomb layers, or, alternatively, the preferred length of the preferred honeycomb cells, is between ⅛ inch and ½ inch and preferably near about 174 inch. Both the core precursor and honeycomb reinforcement layers are suitably sized to provide structures having dimensions which are in accordance with the dimensions of conventional tennis racket structures. A preferred honeycomb structure is made by HEXEL Corp. and identified as 1/16-5052-001.

The core precursor 34 having been sandwiched between the honeycomb layers 26 and 28 is then wrapped or otherwise surrounded with composite fibers. The composite fibers form an uncured shell structure 46 as shown in FIG. 8. For tennis racket frame construction, graphite fibers having a medium modulus from between about 30 million to 40 million pounds per square inch are preferred. The fibers are conventional resin-impregnated graphite fibers which may be supplied either in a filamentary or prewoven sheet form. Although the diameter of the graphite fibers is not critical to the present invention, it is preferred that they have an extremely fine diameter on the order of about 0.0003 of an inch. Further, if additional high strength and stiffness is desired, high modulus graphite fiber may be utilized. The orientation of the graphite fibers is preferably a wrapping configuration with the fibers alternating between +45 degrees and −45 degrees relative the length of the tubular structure. It is also preferred to provide an initial layer in which the fibers are parallel to the length of the tubular structure. Any number of layers may be utilized in preparing a suitable rigid composite shell; however, it has been found for tennis racket applications that approximately three layers of graphite fiber sheets provide the best combination of strength, lightweight and performance. When utilizing three fiber sheets or layers, a preferred fiber orientation includes one layer with the fibers being in line with the longitudinal axis of the tubular structure, another layer with the fibers being located at 45 degree angle to the longitudinal axis of the tubular structure and a third layer with the fibers located perpendicular to the second fiber layer.

The uncured tubular structure as shown in FIG. 8 at 48 is then placed in a suitable mold as shown in FIG. 9. The mold will typically include an upper mold plate 50 middle mold plate 51 and a lower mold plate 52. The mold plates 50, 51 and 52 are clamped together by suitable high-strength clamps or other conventional means. The mold is then heated to the curing temperature of the graphite composite material. This temperature usually is between about 225 degrees F. to about 350 degrees F. At these temperatures, the blowing agent decomposes or otherwise undergoes a chemical reaction to produce the foaming gas which is necessary to force the graphite composite outward against the mold and to additionally force the honeycomb layers 26 and 28 outward into position.

The gas formation also produces the flexible polyvinylchloride foam core. The heating period may be varied depending upon the temperature used and the particular resins and polyvinylchloride utilized. Typically, however, the heating period will be in the range of one half to two hours. Expansion of the foam will generally be in the range of 100 to 200 percent.

The cured and molded tubular structure is shown in FIG. 10. After cooling, the frame structure is removed from the mold. As is apparent, any suitable tubular structures may be made depending upon the mold configuration. This preferred tubular structure, however, has particular applications to tennis rackets and, therefore, conventional tennis racket molds are preferably used.

The racket string holes 30 may be drilled through the cured composite shell 22 and flexible foam core after the racket is removed from the mold. Alternatively, pins may be placed extending through the core precursor and uncured composite shell prior to molding. The pins may then be removed after the molding and curing operation to provide suitable racket string holes 30.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein.

What is claimed is:

1. A tubular frame structure adapted for use as a tennis racket comprising:
   a reinforced foam core including a foam core and at least one honeycomb reinforcement layer;
   a rigid composite tubular shell surrounding said reinforced foam core; and
   a plurality of surfaces defining string holes passing laterally through said tubular frame structure, said string holes passing through said foam core and rigid composite tubular shell, but not passing through said honeycomb reinforcement layer.

2. A tubular frame structure according to claim 1 wherein said foam core is an elastic polymer core.

3. A tubular frame structure according to claim 2 having two honeycomb reinforcement layers disposed between said elastic core and said rigid shell.

4. A tubular frame according to claim 3 wherein said honeycomb reinforcement layers are made from a lightweight metal.

5. A tubular frame according to claim 4 wherein said honeycomb reinforcement layer includes a plurality of honeycomb cells having axes perpendicular to the plane of said honeycomb layer, said honeycomb cells being sandwiched between honeycomb border layers.

6. A tubular frame structure according to claim 5 wherein said honeycomb cells are perpendiculr to said string holes passing through said rigid shell and elastic core.

7. A tubular frame structure according to claim 1 wherein said honeycomb reinforcement is made from a non-metallic material.

8. A tubular frame structure according to claim 2 wherein said elastic core is a flexible vinyl foam.

9. A tubular frame structure according to claim 8 wherein said rigid composite shell is made from resin impregnated fibers selected from the group consisting of graphite fibers, boron fibers, glass fibers and polyamide fibers.

10. In a tubular frame structure adapted for use as a tennis racket including a foam core surrounded by a rigid composite shell wherein the improvement comprises:
    at least one honeycomb reinforcement layer disposed between said foam core and said rigid composite shell;
    a plurality of surfaces defining string holes passing laterally through said frame structure, said string holes passing through said foam core and rigid composite shell, but not passing through said honeycomb layers whereby racket strings passing through said string holes are prevented from contacting said honeycomb.

11. An improved tubular frame structure according to claim 10 wherein said foam core is an elastic polymer.

12. An improved tubular frame structure according to claim 11 wherein said honeycomb layer is made from a lightweight metal.

13. An improved tubular frame structure according to claim 12 wherein said metal is aluminum or an aluminum alloy.

14. A reinforced foam core adapted for use in a tennis racket having a rigid tubular shell comprising a foam core sandwiched between parallel honeycomb reinforcing layers.

15. A reinforced foam core according to claim 14 wherein said foam core is an elastic foam and said honeycomb is made from lightweight aluminum or aluminum alloy.

16. A method for producing a tubular frame structure adapted for use as a tennis racket comprising the steps of:
    preparing a heat foamable foam core precursor;
    sandwiching said foam core precursor between honeycomb reinforcement layers to form a reinforced foam core precursor;
    surrounding said reinforced foam precursor with uncured composite fibers;
    placing said fiber surrounded reinforced foam core precursor into a suitable tennis racket mold and heating said mold at sufficient temperature and for a sufficient time to form said tubular frame structure including a reinforced foam core and rigid composite tubular shell; and
    providing string mounting holes in said tubular frame structure which pass through said foam core and rigid shell, but do not pass through said honeycomb layers.

17. A method according to claim 16 wherein said foam precursor includes a flexible vinyl polymer and a suitable amount of blowing agent.

18. A method according to claim 17 wherein said foam precursor is spirally wrapped flexible polyvinyl chloride having said blowing agent dispersed between the layers of said spiral wrapping.

19. A method according to claim 18 wherein said blowing agent is AZDN.

20. In a method for producing a composite tubular frame structure comprising a rigid outer shell and a core wherein a core precursor is surrounded by an uncured composite shell and placed in a mold whereupn heating of said mold, said core precursor expands to provide internal pressure necessary to shape said composite shell by forcing said shell against said mold, said shell curing to form said rigid outer shell and said expanded core precursor forming said core, wherein the improvement comprises:

sandwiching said core precursor between two honeycomb layers, said layers being oriented so that string holes may be provided in said frame structure which pass through said outer shell and core, but do not pass through said honeycomb layers.

21. A method according to claim 20 wherein said core is an elastic polymer.

22. A method according to claim 20 wherein said honeycomb layers are made from aluminum or aluminum alloy.

* * * * *